Patented May 20, 1924.

1,494,835

UNITED STATES PATENT OFFICE.

BIRGER FJELD HALVORSEN, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS FOR THE PRODUCTION OF ALUMINA.

No Drawing.   Application filed March 2, 1922. Serial No. 540,591.

*To all whom it may concern:*

Be it known that I, BIRGER FJELD HALVORSEN, a citizen of the Kingdom of Norway, residing at Oscarsgate 71, Christiania, Norway, have invented certain new and useful Improvements in Processes for the Production of Alumina, of which the following is a specification.

By treating minerals which contain alumina with nitric acid, solutions are obtained from which solid salts or mixtures of salts comprising nitrate of aluminum and the nitrates of other metals can be produced by evaporation or crystallization or by boiling the solutions until basic nitrates precipitate. Since alumina-bearing minerals generally contain other bases various mixtures of nitrates, for instance, a mixture containing nitrate of aluminum and nitrate potassium are obtained by crystallization of the solutions referred to. Various methods may be employed for forming alumina and separating it from the nitrates of the other metals of such mixtures of nitrates.

For instance, in the case of a mixture of nitrate of aluminum and nitrate of potassium, the alumina can be separated by treating an aqueous solution of the mixture with carbonate of potassium, whereby alumina and nitrate of potassium are obtained. In the case of compositions containing nitrate of sodium, soda can be used whereby nitrate of sodium is obtained. The alumina can also be separated by means of ammonia whereby alumina and a mixture of nitrates consisting of nitrate of ammonium and the nitrates of alkali metals are obtained.

The drawbacks connected with this process are, however, that the alumina is obtained in a gelatinous state and is difficult to work with.

Another process is to separate nitrate of ammonium by means of heating. On performing this process it will be noticed that the nitrate mixture melts at a comparatively low temperature. Gradually as the separation progresses, the solution gets stickier and stickier, till at last it becomes quite solid. The increased viscidity of the solution and the separation of the solid stuffs causes the mass to stick to the walls which are heated rather strongly. This hinders the heat supply and the apparatus stops up little by little. The difficulties this causes are so great that it is hard to construct an apparatus suited to the purpose.

According to the present invention the mentioned difficulties can be avoided by decomposing the nitrate of aluminum in a molten mixture of the nitrates so that the alumina produced by the decomposition of the nitrate of aluminum floats in the molten mixture. The best way to produce the molten mixture is to add to the mixture of nitrates a nitrate of an alkali metal and preferably the nitrate of the same alkali metal as that accompanying the nitrate of aluminum in the mixture of nitrates under treatment. If however it is desired to produce fertilizers as a by product of the alumina product various nitrates can be used, depending upon the composition of the fertilizer salt desired. When a mixture of nitrates is used it will lower the melting point of the molten mixture and thus make it easier to keep it liquid when draining the molten mixture together with the alumina.

The process of separation takes place at such a low temperature that the separated alumina does not react with the alkali metal nitrates to give aluminates. After the reaction is at an end the finished product is drained from the apparatus and it can either be treated discontinuously or the molten mixture can flow from an apparatus that is continually in operation to those apparatus where the alumina is to be separated from the undecomposed nitrates.

The separation can be effected by extraction in the usual way after the smelted solution has stiffened. But the molten mixture will be so thin that the alumina can also be separated from it in the heated state. This will give the technical advantage, that part of the melted nitrate without losing heat can be mixed with the raw stuff while, at the same time, solution of the nitrates and re-evaporation of the solution can be avoided. This will save both heat and apparatus.

I claim:

1. Process for the production of alumina from nitrate of aluminum which consists in heating a mixture of nitrate of aluminum with alkali metal nitrate to a temperature sufficient to decompose the aluminum nitrate but insufficient to decompose the alkali metal nitrate, the quantity of alkali metal nitrate in the mixture being sufficient to produce a freely fluent melt at the specified temperature.

2. Process for the production of alumina as defined in claim 1 in which the alkali metal nitrate employed is potassium nitrate.

In testimony whereof I affix my signature.

BIRGER FJELD HALVORSEN.